United States Patent
Bae et al.

(10) Patent No.: US 11,629,817 B1
(45) Date of Patent: Apr. 18, 2023

(54) DEVICE AND METHOD FOR PREVENTING WORKER SAFETY ACCIDENT DURING MACHINING

(71) Applicant: Andong National University Industry-Academic Cooperation Foundation, Andong-si (KR)

(72) Inventors: Yong-Hwan Bae, Andong-si (KR); Ho-Chan Kim, Gyeongsangbuk-do (KR)

(73) Assignee: Andong National University Industry-Academic Cooperation Foundation, Andong-si (KR)

( * ) Notice: Subject to any disclaimer, the term of this patent is extended or adjusted under 35 U.S.C. 154(b) by 0 days.

(21) Appl. No.: 17/586,833

(22) Filed: Jan. 28, 2022

(30) Foreign Application Priority Data

Dec. 14, 2021 (KR) .......................... 10-2021-0178803

(51) Int. Cl.
  *F16P 3/00* (2006.01)
  *G06V 40/20* (2022.01)
  *G06V 10/82* (2022.01)
  *G08B 21/02* (2006.01)

(52) U.S. Cl.
  CPC .............. *F16P 3/008* (2013.01); *G06V 10/82* (2022.01); *G06V 40/28* (2022.01); *G08B 21/02* (2013.01)

(58) Field of Classification Search
  CPC ......... F16P 3/008; G06V 40/28; G06V 10/82; G08B 21/02
  See application file for complete search history.

(56) References Cited

U.S. PATENT DOCUMENTS

| 2004/0194594 | A1* | 10/2004 | Dils ..................... B23D 59/001 83/13 |
| 2020/0072413 | A1* | 3/2020 | Stoppenbrink .... B23Q 11/0082 |

FOREIGN PATENT DOCUMENTS

KR   10-2020-0126466 A   11/2020

* cited by examiner

*Primary Examiner* — Benyam Haile
(74) *Attorney, Agent, or Firm* — You & IP, LLC

(57) ABSTRACT

Proposed is a device and a method for preventing worker safety accidents during machining and, more particularly, a device and a method for preventing worker safety accidents during machining, which can prevent worker safety accidents in advance by stopping an operation of a chuck or cutter and triggering an alarm when a part of a worker's body is present in the danger zone beyond the safety zone judged by an artificial intelligence (AI)-based analysis of work images/videos captured during turning, milling, and other machining using chucks or cutters.

4 Claims, 4 Drawing Sheets

DEVICE AND METHOD FOR PREVENTING WORKER SAFETY ACCIDENT DURING MACHINING

CROSS REFERENCE TO RELATED APPLICATION

The present Application claims priority to Korean Patent Application No. 10-2021-0178803, filed Dec. 14, 2021, the entire contents of which is incorporated herein for all purposes by this reference.

BACKGROUND OF THE INVENTION

Field of the Invention

The present disclosure relates to a device and a method for preventing worker safety accidents during machining and, more particularly, to a device and a method for preventing worker safety accidents during machining, which can prevent worker safety accidents in advance by stopping an operation of a chuck or cutter and triggering an alarm when a part of a worker's body is present in the danger zone beyond the safety zone judged by an artificial intelligence (AI)-based analysis of work images/videos captured during turning, milling, and other machining using chucks or cutters.

Description of the Related Art

Prevention of safety accidents in the manufacturing process is very important. For example, in the field of processing that involves a lot of manual work, such as machining, the role of hands is very important in the production process. No matter how developed the industry, it will be impossible not to do handicrafts at all. Thanks to technological development and productivity improvement in the machining field, numerical control (NC) machine tools have been introduced and thus there is little need for human intervention. However, in small and medium-sized enterprises, there are still many cases in which workers themselves set a workpiece, operate a machine tool, and perform measurement. Furthermore, technical and vocational education institutions such as technical high schools and vocational training institutes teach machining such as general lathe machining and milling machining. Usually, an operator stops rotating the workpiece when measuring it. However, during workpiece rotation, the operator's hands often go beyond the safe zone and enter the danger zone unintentionally. The most typical case is when chips are removed during rotation.

Korean Patent Application Publication No. 10-2020-0126466 (hereinafter referred to as "conventional art") discloses a machine tool having safety device using biometric information. The machine tool having safety device using biometric information includes: a machine structure configured to perform machining on a workpiece to be machined in an inner machining area selectively sealed by a housing with a door; a numerical controller configured to be connected to a mechanical structure, and control the machining according to a set computer algorithm; a safety device configured to be connected to the numerical controller, detect the biometric information of an operator who drives the mechanical structure, and generate a operation control signal for selectively controlling an operation of the mechanical structure.

However, the problem with the conventional art is that it causes inconvenience to a worker since a biometric information detection sensor must be attached to the worker's body in order to obtain the worker's biometric information (e.g., the worker's heart rate, oxygen saturation, and body temperature), and because whether the worker is at risk is judged based on biometric information, it cannot be a countermeasure against safety accidents that occur when a part of the worker's body comes into contact with the machine tool in motion.

Documents of Related Art

Korean Patent Application Publication No. 10-2020-0126466 ("MACHINE TOOL HAVING SAFETY DEVICE USING BIOMETRIC INFORMATION")

SUMMARY OF THE INVENTION

Accordingly, the present disclosure has been made keeping in mind the above problems occurring in the related art, and the present disclosure is intended to provide a device and a method for preventing worker safety accidents during machining, which can recognize quickly and accurately and take action when a worker's body part is approaching the danger zone, without causing inconvenience to the worker during machining.

In order to achieve the above objective, according to an embodiment of the present disclosure, there is provided a device for preventing worker safety accidents during machining, especially while machining using a machine tool rotating with a workpiece clamped in a chuck or a machine tool with a rotating cutter, the device including: a work image/video acquisition part configured to acquire machining work image/video data by photographing a rotating part of the machine tool and worker's hands; a chuck/cutter drive motor stop circuit configured to stop a drive motor for the chuck or cutter; and a controller configured to receive the machining work image/video data from the work image/video acquisition part and split the data into multiple frames, conduct an artificial intelligence (AI)-based analysis of the work image/video data split into frames, and stop the drive motor for the chuck or cutter by operating the chuck/cutter drive motor stop circuit when it is determined that the worker's hand is in a danger zone while the chuck or cutter is rotating.

The device for preventing worker safety accidents during machining according to the embodiment may further include an alarm part configured to receive a control signal from the controller and trigger an alarm through audio and video when it is determined by the controller that the worker's hands are in the danger zone while the chuck or cutter is rotating.

In the device for preventing worker safety accidents during machining according to the embodiment, the AI-based analysis may derive results by inputting the work image/video data split into frames into a deep-learning artificial neural network trained on a dataset containing image data of a chuck/cutter stop state, image data of the worker's hands visible in a chuck/cutter stop state, image data of the worker's hands visible in a chuck/cutter rotation state, image data of the worker's hands, status information on a chuck/cutter, status information on worker's physical safety, and status information on a worker's presence in the danger zone.

In order to achieve the above objective, according to another embodiment of the present disclosure, there is provided a method for preventing worker safety accidents during machining, the method including: data inputting, in which a controller receives machining work image/video data acquired by a work image/video acquisition part; frame splitting, in which the controller splits the machining work image/video data into multiple frames; determining presence in danger zone, in which the controller determines whether worker's hands are in a danger zone while a chuck or cutter is rotating after conducting an artificial intelligence (AI)-based analysis of the work image/video data split into multiple frames in the frame splitting; and stopping a drive motor for chuck or cutter, in which the controller stops the drive motor for the chuck or cutter by operating a chuck/cutter drive motor stop circuit when it is determined that the worker's hands are in the danger zone while the chuck or cutter is rotating in the determining presence in danger zone.

The method for preventing worker safety accidents during machining according to another embodiment of the present disclosure, may further include alarm triggering, in which the controller operates an alarm part to trigger an alarm through audio and video when it is determined by the controller that the worker's hands are in the danger zone while the chuck or cutter is rotating.

As described above, the device and the method for preventing worker safety accidents during machining, according to the embodiments of the present disclosure, can recognize quickly and accurately and take action when a worker's body part is approaching the danger zone, without causing inconvenience to the worker during machining, by being configured to receive the machining work image/video data from the work image/video acquisition part and split the data into multiple frames, to conduct an artificial intelligence (AI)-based analysis of the work image/video data split into frames, and to stop the drive motor for the chuck or cutter by operating the drive motor stop circuit when it is determined that the worker's hands are in a danger zone while the chuck or the cutter is rotating.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
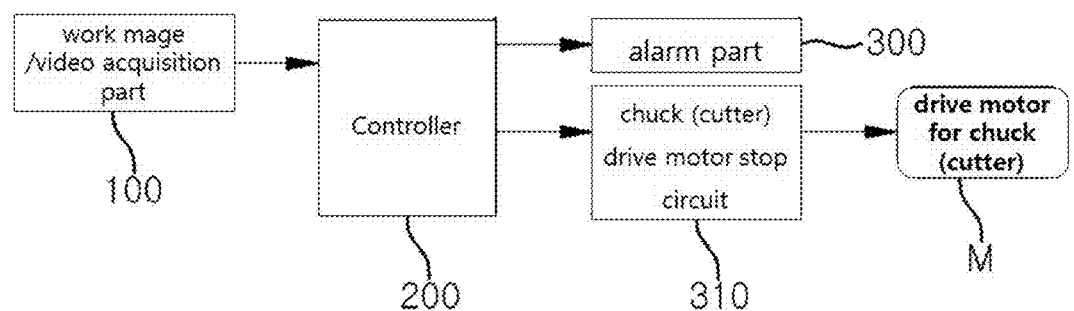
FIG. 1 is a block diagram of a device for preventing worker safety accidents during machining according to an embodiment of the present disclosure.

In describing embodiments of the present disclosure, if it is determined that the detailed description of the known technology related to the present disclosure may unnecessarily obscure the gist of the present disclosure, the detailed description thereof will be omitted. Also, the terms to be described later are terms defined in consideration of functions in the present disclosure, which may vary depending on the intention of a user or an operator, or custom. Therefore, the definition should be made based on the content throughout the specification. The terminology used in the detailed description is intended only to describe the embodiments of the present disclosure and should in no way be construed as limiting. Unless the context clearly indicates otherwise, the expressions in the singular form include the meaning of the plural form. In the description, expressions such as "comprising" or "provided" are intended to indicate certain features, numbers, steps, acts, elements, a combination thereof, and it should not be construed as excluding the presence or possibility of one or more other characteristics, numbers, steps, acts, elements, or any combination thereof other than those described.

In each system shown in the drawings, elements in some instances may each have the same reference number or a different reference number to suggest that the elements represented may be different or similar. However, elements may have different implementations and work with some or all of the systems shown or described herein. The various elements shown in the drawing may be the same or different. Which one is referred to as the first element or which one is called the second element is arbitrary.

In the specification, when one component "transmits", "delivers", or "provides" data or signals to another component, it not only means that one component transmits data or signals directly to another component, but also means that one component transmits data or signals to another component via at least one other component.

Hereinafter, preferred embodiments of the present disclosure will be described in detail with reference to the accompanying drawings.

FIG. 1 is a block diagram of a device for preventing worker safety accidents during machining according to an embodiment of the present disclosure.

As shown in FIG. 1, the device for preventing worker safety accidents during machining according to the embodiment of the present disclosure includes a work image/video acquisition part 100, a controller 200, a chuck/cutter drive motor stop circuit 310, and an alarm part 300.

The work image/video acquisition part 100 acquires machining work image/video data by photographing a rotating part of a machine tool and worker's hands handling the machine tool, and outputs the acquired machining work image/video data to the controller 200.

The controller 200 is a microcomputer that controls all components of the present disclosure. The controller 200 receives the machining work image/video data from the work image/video acquisition part 100 and split the data into multiple frames, conducts an artificial intelligence (AI)-based analysis of the work image/video data split into multiple frames, and stops a drive motor for the chuck or cutter by generating a control signal to the chuck/cutter drive motor stop circuit 310 to initiate an operation of the chuck/cutter drive motor stop circuit 310 when it is determined that the worker's hands are in a danger zone while the chuck or cutter is rotating, while outputting a control signal to the alarm part 300 to trigger an alarm through audio and video.

Figure 2:
FIG. 2 is a view showing an example of image data in which the controller of FIG. 1 trains a deep-learning artificial neural network used for AI analysis.

An artificial neural network used for the AI-based analysis conducted by the controller 200 is trained in deep learning with dataset containing image data as shown in FIG. 2 (e.g. image data of a chuck/cutter stop state, image data of the worker's hands visible in a chuck/cutter stop state, image data of a chuck/cutter rotation state, image data of the worker's hands visible in a chuck/cutter rotation state, and image data of the worker's hands), status information on chuck/cutter (e.g. a chuck/cutter stop state and a chuck/ cutter rotation state), status information on worker's physical safety (e.g. the worker's hands are away from or close to a workpiece in a chuck/cutter stop state, and the worker's hands are away from a workpiece in a chuck/cutter rotation state), and status information on a worker's presence in the danger zone (e.g. the worker's hands are close to a workpiece or is in the danger zone in a chuck/cutter rotation state). When inputting the work image/video data split into multiple frames into the artificial neural network trained in deep learning, information mentioned above such as status information on chuck or cutter, status information on worker's physical safety, and status information on a worker's presence in the danger zone can be derived.

The chuck/cutter drive motor stop circuit 310 receives a control signal from the controller 200 and performs a switching operation to stop the drive motor (M) for the chuck or cutter.

The alarm part 300 receives a control signal from the controller 200 and triggers an alarm through audio and video, when it is determined by the controller that the worker's hands are in the danger zone while the chuck or cutter is rotating, in order to notify the worker and those around him/her that the worker is in danger, so that necessary action can be taken.

The alarm part 300 may also output status information on chuck or cutter and status information on worker's physical safety through audio and video in addition to status information on a worker's presence in the danger zone.

A method for preventing worker safety accidents, using the device for preventing worker safety accidents during machining according to the embodiment of the present disclosure configured as described above, will be described.

Figure 3:
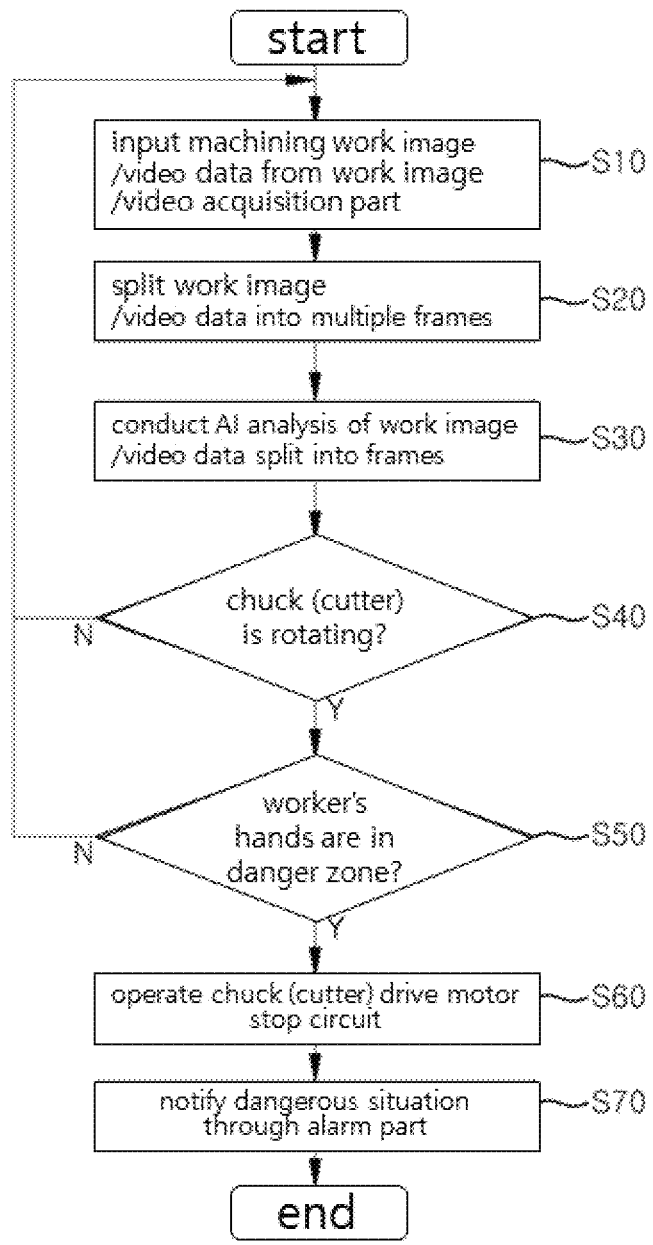
FIG. 3 is a flowchart to explain a method for preventing worker safety accidents during machining according to an embodiment of the present disclosure.

FIG. 3 is a flowchart to explain a method for preventing worker safety accidents during machining according to an embodiment of the present disclosure, and here, S stands for step.

First, a rotating part of a machine tool and a worker's hand are photographed by a work image/video acquisition part 100 to acquire machining work image/video data, and a controller 200 receives S10 the acquired machining work image/video data.

Next, the controller 200 splits S20 the received machining work image/video data into multiple frames to generate multiple frames of work image/video data.

Then, the controller 200 conducts S30 an artificial intelligence (AI)-based analysis of the work image/video data split into multiple frames generated in the S20, and determines S40, S50 whether a chuck or cutter is rotating and worker's hands are in a danger zone.

When it is determined Y that the chuck or cutter is rotating and the worker's hands are in the danger zone in the S40 and S50, the controller 200 stops a drive motor M for the chuck or cutter by initiating S60 an operation of the chuck/cutter drive motor stop circuit 310 while operating an alarm part 300 to trigger S70 an alarm through audio and video.

Meanwhile, when it is determined N in the S40 and S50 that the chuck or cutter is in a stop state or the worker's hands are not in the danger zone, the process proceeds to step S10.

Figure 4:
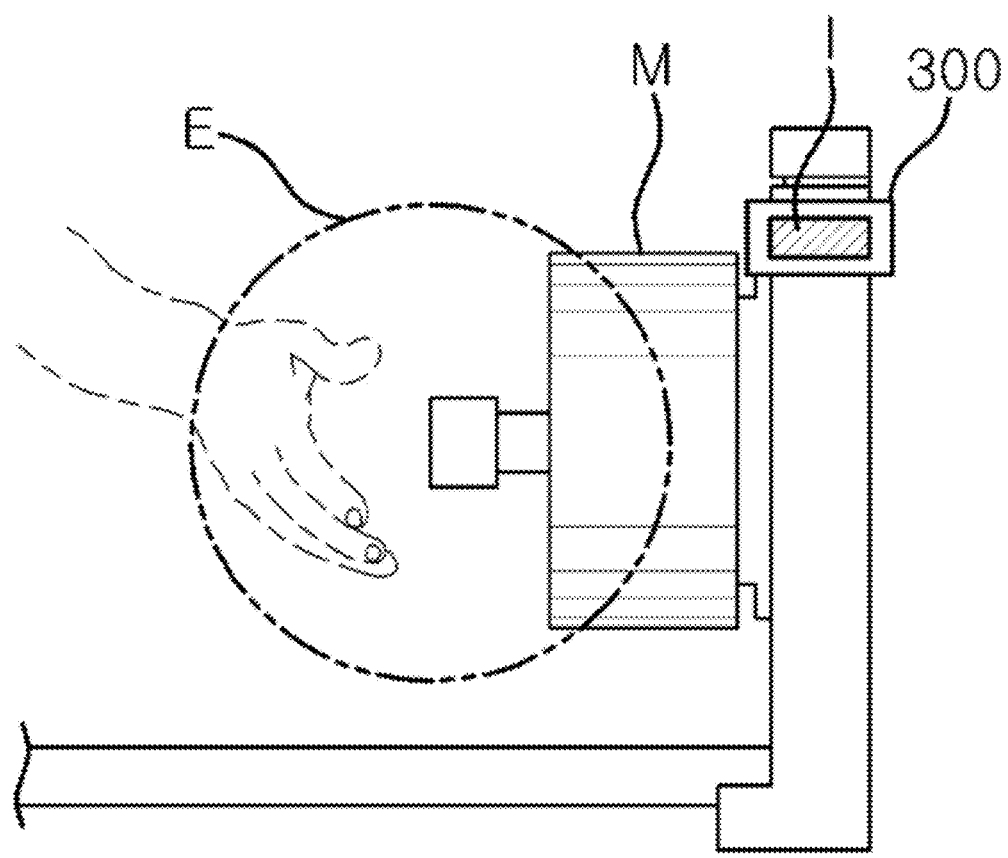
FIG. 4 is a view showing an example of a device for preventing safety accidents according to another embodiment of the present disclosure.

FIG. 4 is a view showing an example of a device for preventing safety accidents according to another embodiment of the present disclosure. As shown in FIG. 4, an alarm part 300 may be provided near a danger zone E. An identification area I may be provided inside the alarm part 300. The identification area I may be a criterion for setting and deciding the danger zone. The device for preventing safety accidents may check the identification area in the acquired image data, set and decide the danger zone based on the identification area, and determine whether to generate control signals, including alarms, based on the presence of worker's hands within the danger zone.

The device for preventing safety accidents according to another embodiment of the present disclosure may identify an identification area I in the acquired image/video data, set a danger zone by checking a preset (possibly input or learned) relative position value, determine whether worker's hands are in the danger zone.

In the case of the device for preventing safety accidents according to another embodiment of the present disclosure, the identification area I may be a pattern, color, or a combination thereof determined to be easily distinguished from the background in the image/video data.

In the case of the device for preventing safety accidents according to another embodiment of the present disclosure, when it is determined that the operator's hands are in the danger zone and a chuck or cutter is rotating, a controller 200 may generate a control signal to trigger an alarm by an alarm part 300 through audio and video, enabling the worker to recognize alarm conditions more quickly.

In the case of the device for preventing safety accidents according to another embodiment of the present disclosure, the alarm part 300 may further include a high-pressure injection device and a high-pressure injection device driving part for spraying high-pressure gas toward a part of the worker's body (e.g., hands, arms, torso).

When the controller 200 determines that the operator's hand is present in the danger zone while the chuck or cutter is rotating, the controller 200 may generate a control signal to the alarm part 300 to operate the high-pressure injection device by the corresponding high-pressure injection device driving part to protect the worker in a dangerous situation.

The device for preventing safety accidents according to another embodiment of the present disclosure may further include an airbag and an airbag driving device provided in a machine tool body. When the controller 200 determines that the worker's hands are in the danger zone while the chuck or cutter is rotating, the controller 200 may generate a control signal to activate the airbag by the airbag driving device, so that the airbag protects the worker by pressing a part of the worker's body to make the worker move away from the machine tool.

The device and the method for preventing worker safety accidents during machining, according to the embodiments of the present disclosure, may recognize quickly and accurately and take action when a worker's body part is approaching the danger zone, without causing inconvenience to the worker during machining, by being configured to receive the machining work image/video data from the work image/video acquisition part and split the data into multiple frames, to conduct an artificial intelligence (AI)-based analysis of the work image/video data split into frames, and to stop the drive motor for the chuck or cutter by operating the drive motor stop circuit when it is determined that the worker's hands are in a danger zone while the chuck or cutter is rotating.

In the drawings and specification, optimal embodiments are disclosed, and certain terms used herein are only for the purpose of describing the embodiments of the present disclosure and not to limit the meaning or limit the scope of the present disclosure as set forth in the claims. Therefore, it will be understood by a person skilled in the art to which the present disclosure pertains that various modifications and equivalent other embodiments are possible. Accordingly, the true technical protection scope of the present disclosure should be determined by the technical spirit of the appended claims.

What is claimed is:

1. A device for preventing worker safety accidents during machining using a machine tool rotating with a workpiece clamped in a chuck or a machine tool with a rotating cutter, the device comprising:
   a work image/video acquisition part configured to acquire machining work image/video data by photographing a rotating part of the machine tool and a worker's hands;
   a chuck/cutter drive motor stop circuit configured to stop a drive motor for the chuck or cutter; and
   a controller configured to receive the machining work image/video data from the work image/video acquisition part and split the data into multiple frames, conduct an artificial intelligence (AI)-based analysis of the work image/video data split into frames, and stop the drive motor for the chuck or cutter by operating the chuck/cutter drive motor stop circuit when it is determined that the worker's hands are in a danger zone while the chuck or cutter is rotating,
   wherein the AI-based analysis derives results by inputting the work image/video data split into frames into an artificial neural network trained in deep learning with dataset containing image data of a chuck/cutter stop state, image data of the worker's hands visible in a chuck/cutter stop state, image data of the worker's hands visible in a chuck/cutter rotation state, image data of the worker's hands, status information on the chuck or cutter, status information on worker's physical safety, and status information on a worker's presence in the danger zone.

2. The device for preventing worker safety accidents during machining of claim 1, further comprising:
   an alarm part configured to receive a control signal from the controller and trigger an alarm through audio and video when it is determined by the controller that the worker's hands are in the danger zone while the chuck or cutter is rotating.

3. A method for preventing worker safety accidents during machining using a device, the method comprising:
   data inputting, in which a controller receives machining work image/video data acquired by a work image/video acquisition part;
   frame splitting, in which the controller splits the machining work image/video data into multiple frames;
   determining presence in danger zone, in which the controller determines whether worker's hands are in a danger zone while a chuck or cutter is rotating after conducting an artificial intelligence (AI)-based analysis of the work image/video data split into multiple frames in the frame splitting, wherein the AI-based analysis derives results by inputting the work image/video data split into frames into an artificial neural network trained in deep learning with dataset containing image data of a chuck/cutter stop state, image data of the worker's hands visible in a chuck/cutter stop state, image data of the worker's hands visible in a chuck/cutter rotation state, image data of the worker's hands, status information on the chuck or cutter, status information on worker's physical safety, and status information on a worker's presence in the danger zone; and
   stopping a drive motor for chuck or cutter, in which the controller stops the drive motor for the chuck or cutter by operating a chuck/cutter drive motor stop circuit when it is determined that the worker's hands are in the danger zone while the chuck or cutter is rotating in the determining presence in danger zone.

4. The method for preventing worker safety accidents of claim 3 further comprising:
   alarm triggering, in which the controller operates an alarm part to trigger an alarm through audio and video when it is determined by the controller that the worker's hands are in the danger zone while the chuck or cutter is rotating.

* * * * *